(12) United States Patent
Konig et al.

(10) Patent No.: US 9,442,956 B2
(45) Date of Patent: Sep. 13, 2016

(54) WAYPOINTS GENERATION SYSTEMS AND METHODS

(71) Applicant: Navico Holding AS, Egersund (NO)

(72) Inventors: Gregory Konig, Tulsa, OK (US); Jeremiah Clark, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 14/307,962

(22) Filed: Jun. 18, 2014

(65) Prior Publication Data

US 2015/0369610 A1    Dec. 24, 2015

(51) Int. Cl.
*G01C 21/20* (2006.01)
*G06F 17/30* (2006.01)
*H04N 1/32* (2006.01)
*G08G 3/00* (2006.01)

(52) U.S. Cl.
CPC ....... *G06F 17/30241* (2013.01); *G01C 21/203* (2013.01); *H04N 1/32101* (2013.01); *G08G 3/00* (2013.01)

(58) Field of Classification Search
CPC . G06C 21/00; G06C 21/20; G06F 17/30241; G06F 3/048842; H04N 1/32101
USPC .................. 701/467, 533; 715/771
See application file for complete search history.

(56) References Cited

U.S. PATENT DOCUMENTS

| | | | |
|---|---|---|---|
| 7,287,088 B1* | 10/2007 | Anderson | 709/235 |
| 7,782,359 B2* | 8/2010 | Lee | 348/113 |
| 8,321,395 B2* | 11/2012 | Wallace et al. | 707/705 |
| 8,346,415 B1* | 1/2013 | Hinnant, Jr. | 701/21 |
| 2008/0051991 A1* | 2/2008 | Lee et al. | 701/209 |
| 2011/0055284 A1* | 3/2011 | Wallace | G06F 17/30241 707/802 |
| 2014/0013260 A1* | 1/2014 | Thomas | G01C 21/00 715/771 |
| 2014/0181259 A1* | 6/2014 | You | H04L 65/4069 709/219 |
| 2014/0200806 A1* | 7/2014 | Carnevali | 701/533 |
| 2015/0293737 A1* | 10/2015 | Quinn | G06F 3/13 345/440.1 |
| 2016/0016651 A1* | 1/2016 | Anderson | B63H 25/04 701/2 |

* cited by examiner

*Primary Examiner* — Marthe Marc-Coleman
(74) *Attorney, Agent, or Firm* — Nelson Mullins Riley & Scarborough LLP

(57) ABSTRACT

Described herein are implementations of various technologies for a method. The method may receive a request to record images. The method may send a trigger to a marine electronics device in response to receiving the request to record images. The method may receive navigational data regarding a location of the marine electronics device. The method may generate a waypoint based on the navigational data in response to the trigger.

17 Claims, 7 Drawing Sheets

WAYPOINTS GENERATION SYSTEMS AND METHODS

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Being able to record previous locations on a fishing trip can be very useful for future marine activities. Knowing a particular location during a sea voyage may allow people to recall the site of particular events at a later date, such as the local where they caught a fish.

SUMMARY

Described herein are implementations of various technologies for a method. The method may receive a request to record images. The method may send a trigger to a marine electronics device in response to receiving the request to record images. The method may receive navigational data regarding a location of the marine electronics device. The method may generate a waypoint based on the navigational data in response to the trigger.

In one implementation, the images may be part of a video recording. The request to record images may be received by a camera device, smartphone or a video camera. The trigger may be sent by a camera device, a smartphone or a video recorder. The navigational data may be received and the waypoint may be generated by the marine electronics device. The method may include recording the images. The method may include sending the recorded images to the marine electronics device. The method may include associating the waypoint with the recorded images. The method may include storing the waypoint in association with the recorded images. The waypoint or the recorded images may be stored on a cloud server. The navigational data may include latitude or longitudinal coordinates of the marine electronics device. The waypoint may include information pertaining to the depth to the ocean floor from a marine vessel having the marine electronics device. The waypoint may include the depth of the marine vessel in the water.

Described herein are implementations of various technologies for a method. In one implementation, a non-transitory computer-readable medium having stored thereon computer-executable instructions which, when executed by a computer, cause the computer to perform various actions. The actions may include receiving a request to record images or videos. The actions may include recording the images or the videos. The actions may include sending a trigger to a marine electronics device. The trigger may cause the marine electronics device to generate a waypoint.

In one implementation, the actions may include associating the recorded images or videos with the trigger using metadata stored with the recorded images or videos. The actions may include sending the recorded images or videos to the marine electronics device at a predetermined time. The images or videos may be recorded using a camera device, a smartphone, or a video camera.

Described herein are implementations of various technologies for a method. In one implementation, a non-transitory computer-readable medium having stored thereon computer-executable instructions which, when executed by a computer, cause the computer to perform various actions. The actions may include receiving a trigger for generating a waypoint. The actions may include receiving navigational data regarding a location of a marine electronics device. The actions may include generating the waypoint based on the navigational data in response to receiving the trigger.

In one implementation, the actions may include receiving an image identifier for images at substantially the same time that the trigger for generating the waypoint was received. The actions may include associating the generated waypoint with the images using the image identifier. The image identifier may be a reduced-size image of one of the images. The actions may include receiving images from a camera device. The actions may include determining whether the received images are associated with the generated waypoint. The actions may include storing the generated waypoint in association with the received images if it is determined that the images are associated with the generated waypoint. The actions may include receiving metadata for the received images. The received images may be determined to be associated with the generated waypoint based on the metadata. The actions may include displaying the generated waypoint as an icon on a map. The icon may include a thumbnail of the received images associated with the generated waypoint.

Described herein are implementations of various technologies for a method. In one implementation, a non-transitory computer-readable medium having stored thereon computer-executable instructions which, when executed by a computer, cause the computer to perform various actions. The actions may include receiving a selection of stored images. The actions may include generating a navigation route having waypoints that are associated with the selected images. The actions may include displaying the navigation route.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
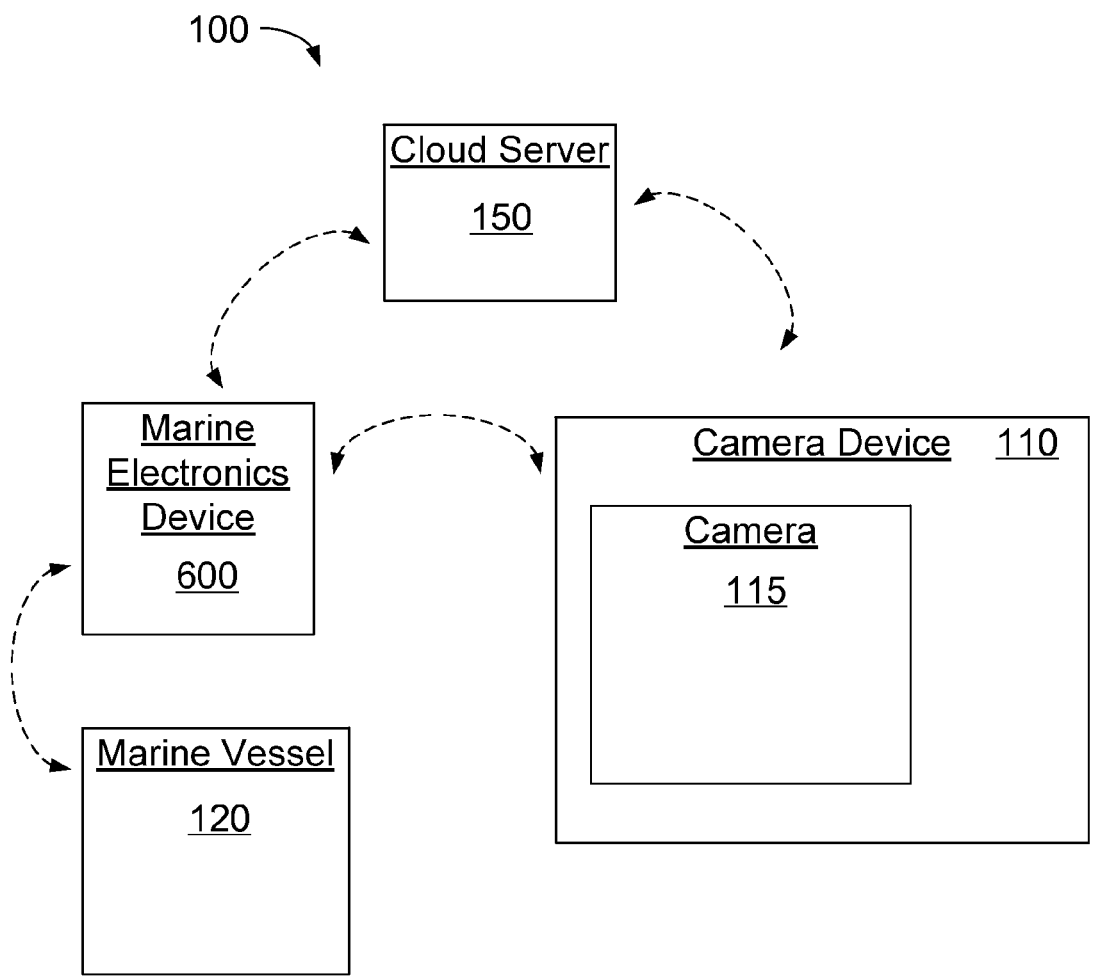
FIG. 1 illustrates a waypoint generation system in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations of a waypoint generation system described herein will now be described in more detail with reference to FIGS. 1-7.

FIG. 1 illustrates a block diagram of a waypoint generation system 100 in accordance with implementations of various techniques described herein. The waypoint generation system 100 may be used to create waypoints automatically throughout a trip and associate the waypoints with images and video from the trip. For more information regarding creating waypoints in association with images or video, see FIGS. 2 and 4 below. The waypoint generation system 100 may include several components, such as a camera device 110, a marine electronics device 600, a cloud server 150 and a marine vessel 120. The camera device 110 may include a camera 115 and be any such device that may have camera-like features implemented in the camera device 110. For instance, the camera device 110 may be a digital camera, a smart phone, Google Glass™, a video recorder, or any other similar device. For more information regarding the marine electronics device 600, see the section titled MARINE ELECTRONICS DEVICE below. The cloud server 150 may communicate with the marine electronics device 600 and/or the camera device 110 over a wired or wireless connection. The cloud server 150 may be used for storing images, video, waypoints and other files on the Internet, and may provide a backup for files from the marine electronics device 600 or the camera device 110. As such, the cloud server 150 may synchronize its files with those stored on the marine electronics device 600 or the camera device 110.

Figure 2:
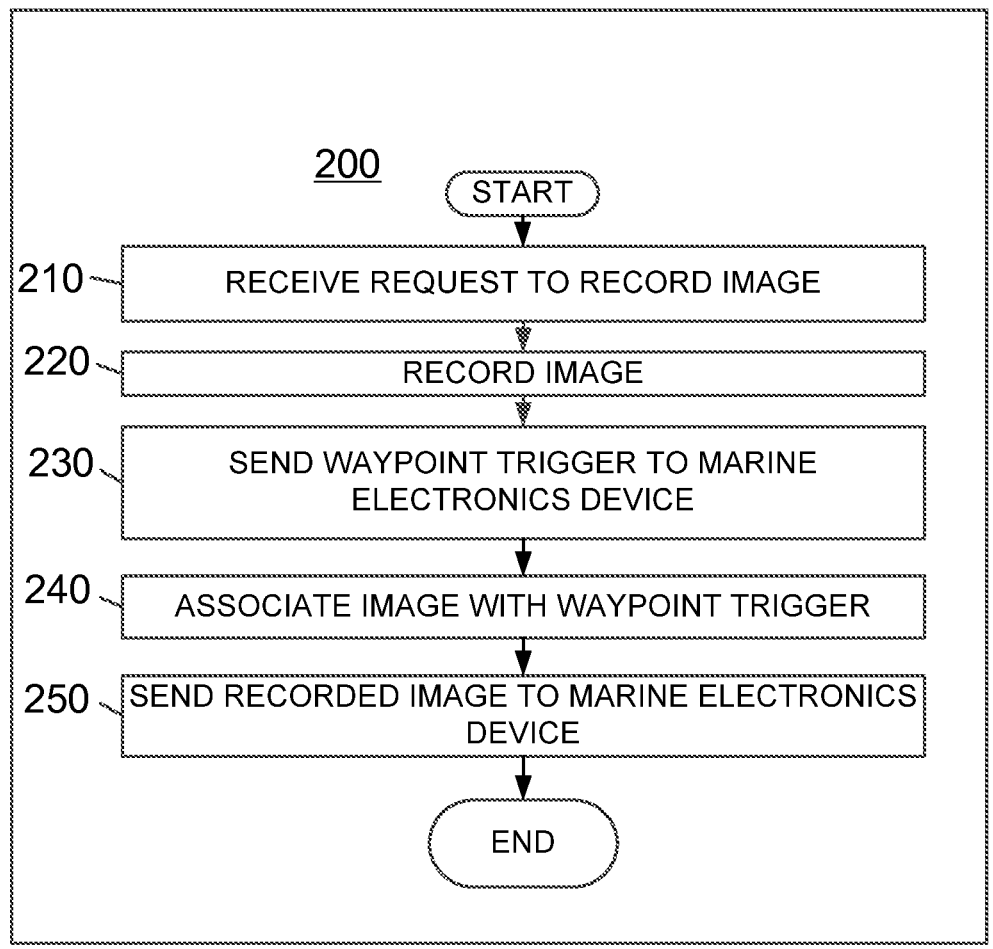
FIG. 2 is a flow diagram of a waypoint generation method in accordance with implementations of various techniques described herein.

FIG. 2 illustrates a flow diagram of a waypoint generation method 200 in accordance with implementations of various techniques described herein. In one implementation, method 200 may be performed by one or more components of the waypoint generation system 100, such as the camera device 110. It should be understood that while method 200 indicates a particular order of execution of operations, in some implementations, certain portions of the operations might be executed in a different order. Further, in some implementations, additional operations or steps may be added to the method 200. Likewise, some operations or steps may be omitted.

At block 210, the camera device 110 may receive a request to record an image (i.e., "the recorded image"). For instance, a user may press a button on the camera device 110 to take a picture. Pressing the button may serve as a request in block 210. Requests to record images may also be performed through voice activation, automatically in response to a wearable device, or by any other applicable methods.

In one implementation, the waypoint generation system 100 may receive a request to record video rather than an image at block 210. For instance, the image at block 210 may include part of a video recording. As such, video recordings and a request to record video may be used in place of recorded images and the request to record images in method 200 and method 400 below.

At block 220, the camera device 110 may record an image. For instance, the camera device 110 may record the image with the camera 115. While the camera 115 is shown as being part of the camera device 110 in FIG. 1, in other implementations, the camera device 110 may be separate from the camera 115. For instance, the camera device 110 may communicate wirelessly to a video camera to capture a video recording.

At block 230, the camera device 110 may send a waypoint trigger to a marine electronics device 600. For instance, the waypoint trigger may be a signal, message, or a command transmitted either wirelessly or through a wired connection. The waypoint trigger may include a request to generate a waypoint using the marine electronics device 600. As such, the waypoint trigger may be automatically sent by the camera device 110 in response to block 210 or block 220, and be configured to cause the marine electronics device 600 to generate a waypoint for a particular location. The waypoint may be created based on the location of the marine electronics device 600 or the marine vessel 120 at substantially the same time that an image is recorded or a picture is taken with the camera device 110. For more information regarding waypoints, see FIGS. 3 and 5 below. In one implementation, one waypoint trigger may be sent in response to a plurality of images that were recorded at particular location.

Figure 3:
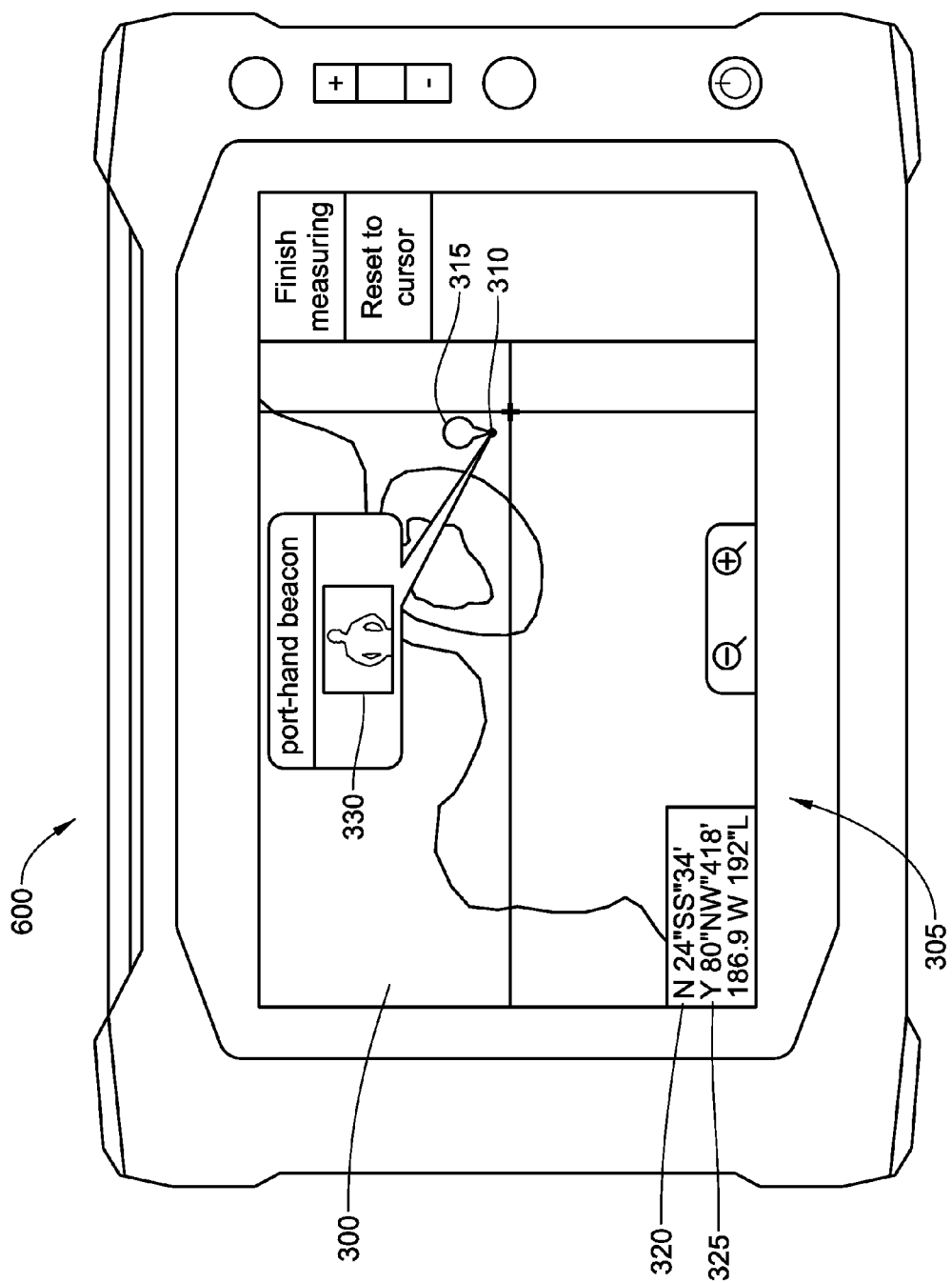
FIG. 3 is a schematic of a chart diagram with waypoints in accordance with various techniques described therein.

FIG. 3 is a schematic of a chart diagram 300 with waypoints in accordance with various techniques described therein. The chart diagram 300 may be a localized map of the location surrounding the marine electronics device 600 or the marine vessel 120, which may appear on screen 305. The center of the chart diagram 300 may indicate the current location of the marine electronics device 600 or the marine vessel 120.

To generate waypoints, navigational data may be obtained and stored in a waypoint. For instance, a global positioning system (GPS) 780 may determine the location of the marine electronics device 600 using GPS satellites. As such, the marine electronics device 600 may use the GPS 780 to record the latitude 320 and longitude 325 coordinates of the marine vessel 120 and store the information in a waypoint 310. Furthermore, stored waypoints may be used to reference information about a particular location at a later date. In regard to retrieving information from the waypoint 310, the waypoint 310 may be represented on the screen 305 with an icon 315. Selecting the icon 315 may display on the screen 305 any information, such as a recorded image taken at the location, that is associated with the waypoint 310. Accordingly, a user may add, delete or modify information associated with the waypoint 310.

In regard to the types of information stored with waypoints, the waypoint 310 may include the date and time when the waypoint 310 was made, such as the time when a waypoint trigger was received or when an image was recorded. In addition, a user may add notes that are associated and/or stored with the waypoint 310. The waypoint 310 may also include information such as the depth of the marine vessel 120 in the water, estimated water temperature, weather conditions, water conditions, depth to the ocean floor at the waypoint 310, the estimated water temperature at the floor of the body of water and other environmental data obtained by the marine vessel 120 or the marine electronics device 600. The ocean depth at the waypoint 310 may be determined using a sonar system 785 that sends sound waves to the ocean floor. Waypoints may also describe relative markers such as the relative location of a waypoint with respect to a designated physical landmark (e.g., 300 feet SW of a lighthouse). For more information regarding the GPS system 780 or the sonar system 785, see the section titled Computing System below.

Multiple waypoints may be combined to form a navigation route for the marine vessel 120. Navigation routes may be used to chart a course from a place of origination to a destination, and include points, such as waypoints, that are the endpoints of different legs of the charted course. For example, if a user uses a navigation system, the navigation system may build a route for the user to follow to get to their destination. In certain implementations, the user may build a navigation route by selecting the endpoints of each leg of the charted course. For more information regarding navigation routes, see FIG. 5 below.

Returning to FIG. 2, at block 240, the camera device 110 may associate the recorded image with the waypoint trigger from block 230. For instance, the metadata of the recorded image may have an identification that links the recorded image with a corresponding waypoint trigger that was sent at substantially the same time that the recorded image were recorded. As such, where multiple images are stored on the camera device 110, different images may correspond to different waypoints for the route of an entire trip, or a group of images taken at a single locale may be associated with a single waypoint.

At block 250, the camera device 110 may send the recorded image to the marine electronics device 600. The transmission between the camera device 110 and the marine electronics device 600 may be over a wired or wireless connection. In one implementation, the camera device 110 may upload the images to the marine electronics device 600 at a predetermined time. For instance, the camera device 110 may be set to upload stored images to the marine electronics device 110 upon reaching the final destination of a trip. Alternatively, the camera device 110 may be configured to upload the images when the number of images reaches a predetermined threshold/number.

The camera device 110 may upload the recorded image to the cloud server 150. As such, the cloud server 150 may be an image hosting website on the Internet where users may post the recorded image. Accordingly, the marine electronics device 600 may download recorded images from the cloud server 150 and associate respective waypoints that are stored on the marine electronics device 600 with the downloaded images.

Figure 4:
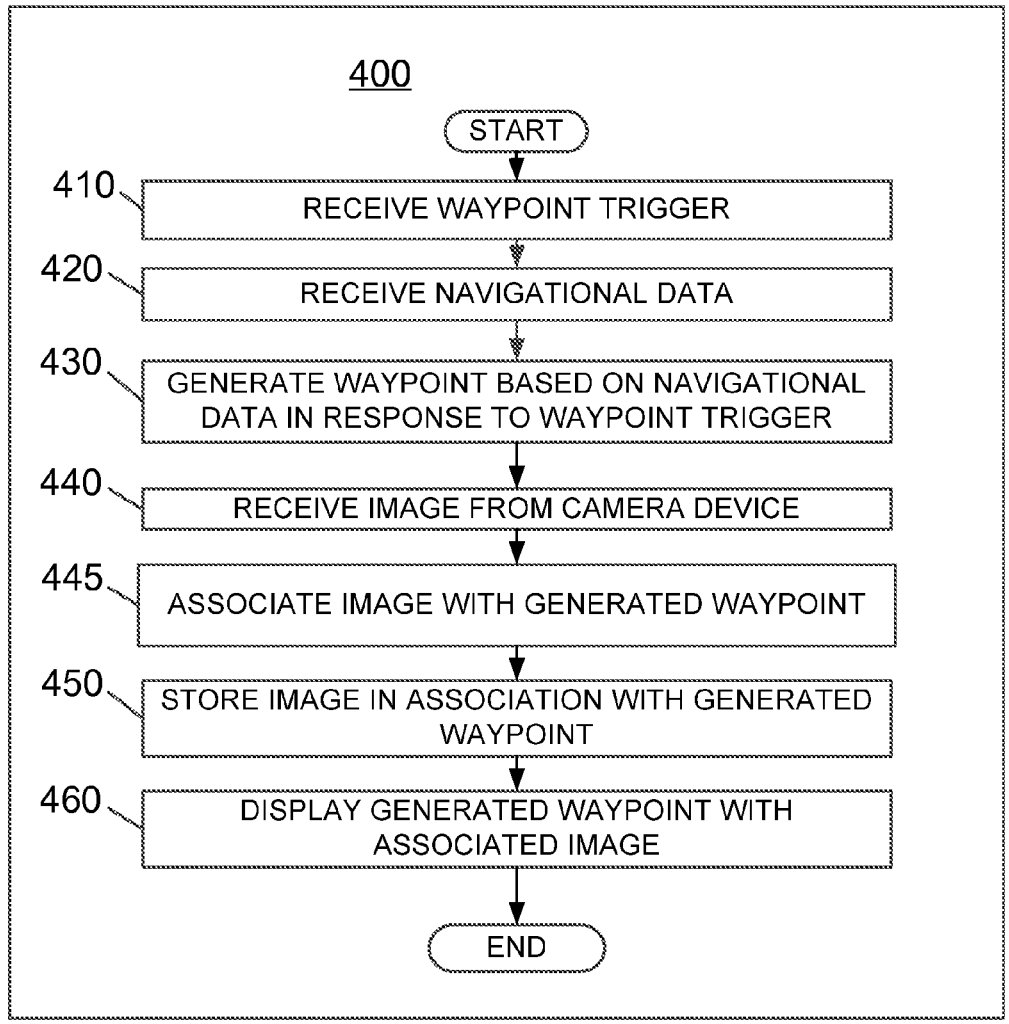
FIG. 4 is a flow diagram of a method for associating waypoints with images in accordance with implementations of various techniques described herein.

FIG. 4 illustrates a flow diagram of a method 400 for associating waypoints with images in accordance with implementations of various techniques described herein. In one implementation, method 400 may be performed by the marine electronics device 600. It should be understood that while method 400 indicates a particular order of execution of operations, in some implementations, certain portions of the operations might be executed in a different order. Further, in some implementations, additional operations or steps may be added to the method 400. Likewise, some operations or steps may be omitted.

At block 410, the marine electronics device 600 may receive a waypoint trigger. The waypoint trigger may be received from the camera device 110, and may be similar to the one described at block 230 above.

At block 420, the marine electronics device 600 may receive navigational data. For instance, the navigational data may include data from the GPS 780, data from the sonar system 785, latitude and/or longitudinal data or any other data regarding the location or navigation of the marine vessel 120 or the marine electronics device 600. For more information regarding different types of navigational data, see FIG. 3 above At block 430, the marine electronics device 600 may generate a waypoint (i.e., "the generated waypoint") based on the navigational data from block 420. As such, the generated waypoint may be created in response to the waypoint trigger received at block 410, and the generated waypoint may be similar to the waypoint 310 described in regard to FIG. 3. The generated waypoint may be created at substantially the same time that the waypoint trigger was received, which may capture the location of the marine electronics device 600 when an image is recorded at block 220 above. Furthermore, the generated waypoint may be stored along with other waypoints on the marine electronics device 600.

At block 440, the marine electronics device 600 may receive an image (i.e., "the received image") from the camera device 110. For instance, the marine electronics device 600 may download one or more images at the end of the trip. In another implementation, the marine electronics device 600 may download images from the cloud server 150.

At block 445, the marine electronics device 600 may associate the received image (i.e., referred to as "the associated image") with the generated waypoint. The marine electronics device 600 may determine whether one or more stored waypoints on the marine electronics device 600 correspond to one or more received images using various association methods described below.

In one implementation, the marine electronics device 600 may determine which waypoint trigger corresponds to a particular received image. This may be performed using metadata stored with the particular received image. The marine electronics device 600 may then determine which stored waypoint was generated in response to the determined waypoint trigger. Using that information, the marine electronics device 600 may associate the stored waypoint with the particular received image.

In another implementation, the camera device 110 may send an image identifier, such as a reduced-sized image (i.e., "a thumbnail image") of a recorded image, to the marine electronics device 600. The image identifier may be sent at substantially the same time that a respective waypoint trigger was sent for a recorded image on the camera device 110. The image identifier may then be stored with a waypoint that was generated in response to the respective waypoint trigger. At a later time, the marine electronics device 600 may then link or associate that waypoint with a recorded image using the image identifier. If the image identifier is a thumbnail image, the marine electronics device 600 may match the thumbnail image with the corresponding full-sized recorded image. If the image identifier is an identification number, the marine electronics device 600 may determine whether any recorded image has that identification number, such as in the recorded image's metadata.

In another implementation, waypoints generated by the marine electronics device 600 may be associated with images that have a substantially similar creation time as a particular waypoint. For instance, a time stamp stored with a particular waypoint may be compared with a time stamp stored with an image in order to make the association. If a waypoint is made in response to the waypoint trigger, any images generated by the camera device 110 may be associated with the waypoint made at approximately the same time. The date and time when an image was recorded by the camera device 110 may be stored on the image or in metadata for the image. The marine electronics device 600 may then compare the date and time that the waypoint was made with the recording date and time of the image. At the end of a boating trip, for instance, the marine electronics device 600 may receive the images made during the trip, and associate the images with waypoints by matching the date and time of particular waypoints with their respective images.

At block 450, the marine electronics device 600 may store the generated waypoint with the associated image. For instance, the received image and the waypoint may be stored in a database on the marine electronics device 600.

At block 460, the marine electronics device 600 may display the generated waypoint from block 430 with an associated image. For instance, in regard to FIG. 3, selecting the icon 315 may display a thumbnail 330 of the received image that corresponds to the waypoint 310. In an implementation with a plurality of waypoints, the marine electronics device 600 may display a chart that shows the waypoints alongside their associated images or thumbnail images.

Figure 5:
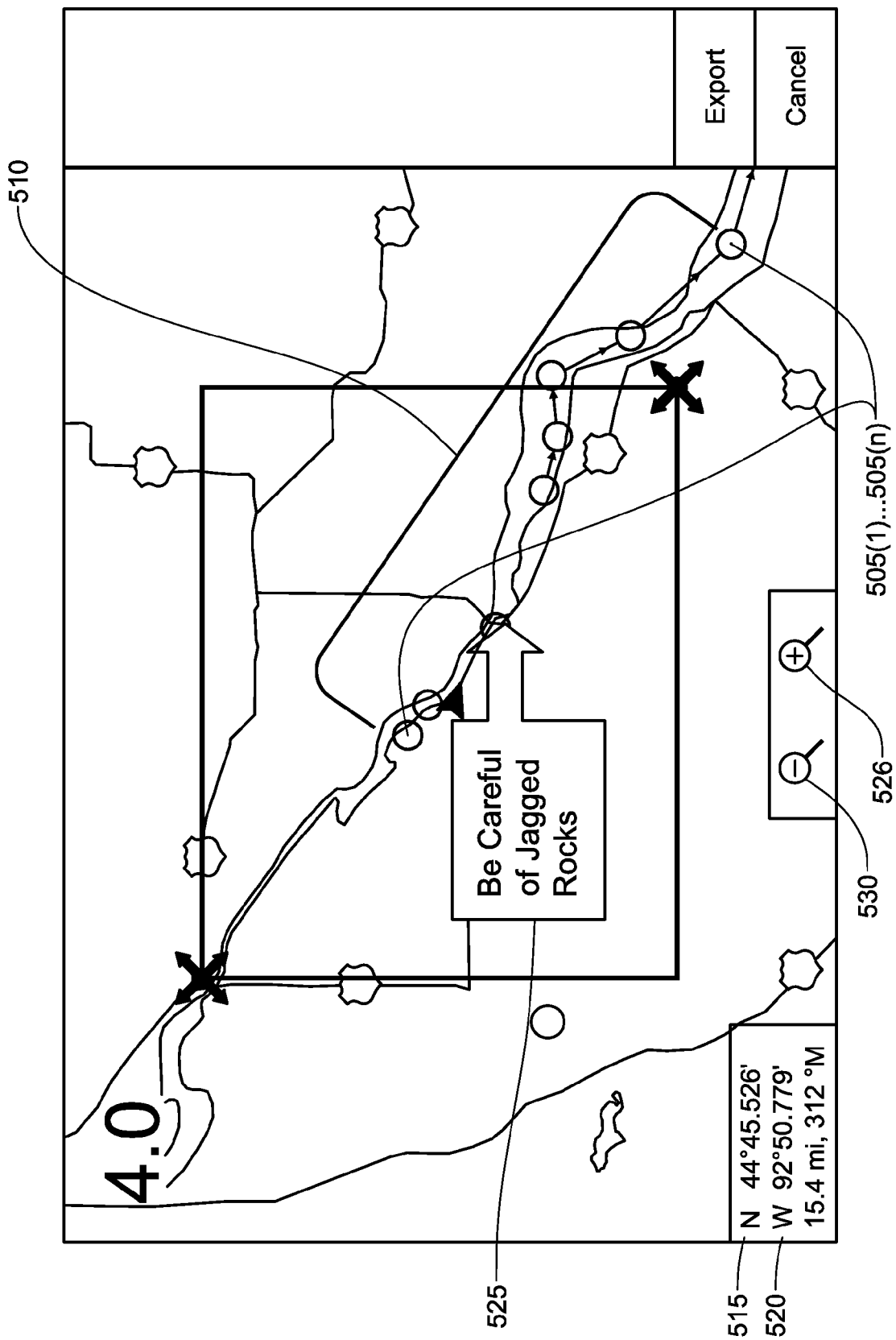
FIG. 5 is a schematic of a chart diagram with route data in accordance with various techniques described herein.

FIG. 5 is a schematic of a chart diagram with waypoints 505(1) . . . 505(n) forming a route 510, such as a navigation route, in accordance with implementations of various techniques described herein. A route 510 may include a point of origination 505(1) and a point of destination 505(n). The user may also use zooming 526, 530 on the chart diagram to view a larger or finer region when forming the route 510.

A user may select waypoints 505 forming the route 510 in a similar manner as selecting waypoints 310. That is, after the waypoints 505(1) . . . 505(n) are selected, the route 510 may be formed by a user request, such as a selection from a menu. In certain implementations, where the waypoints 505(1) . . . 505(n) are in close proximity to each other, the marine electronics device 600 may automatically connect the waypoints 505(1) . . . 505(n) to form a route 510.

In one implementation, a user may select various images that are associated with waypoints to generate a navigational route. A user may seek to retrace a previous trip based on one or more images. After selecting which images that the user desires to revisit, the marine electronics device 600 may create a navigational route using waypoints that correspond to the selected images. This may allow a user to plan a new trip by selecting particular locations from previous images without regard to whether the images are from the same or different trips.

Each of the waypoints 505(1) . . . 505(n) that form the route 510 built by the user may be stored, along with the longitude 515 and latitude 520 associated with each point, as well as any notes 525 and icons that are associated with the respective waypoints 505(1) . . . 505(n).

Marine Electronics Device

Figure 6:
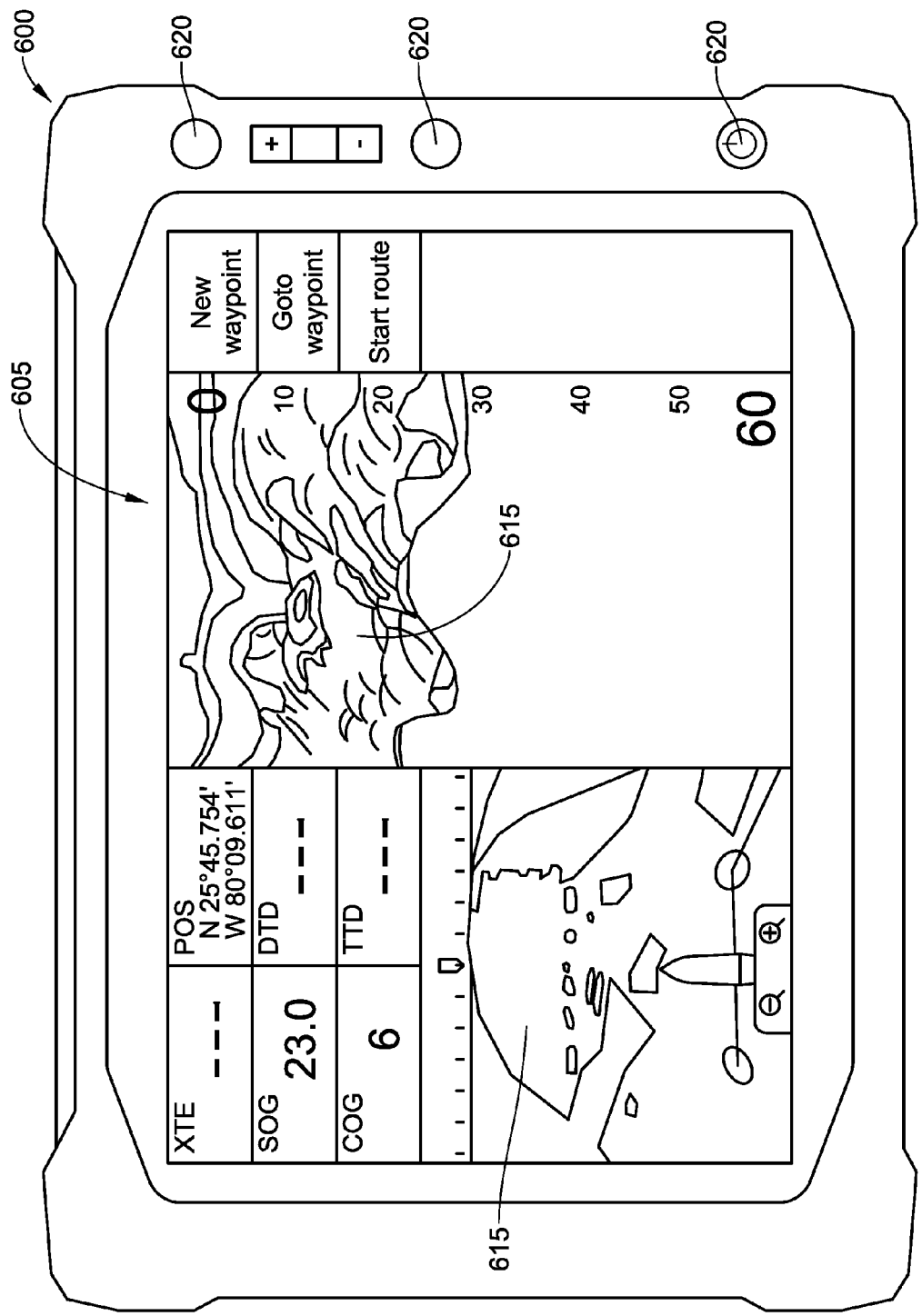
FIG. 6 illustrates a schematic of a marine electronics device in accordance with implementations of various techniques described herein.

FIG. 6 illustrates a schematic diagram of a marine electronics device 600 in accordance with various implementations described herein. The components of the marine display device 600 are described in more detail with reference to the computing system 700 in FIG. 7. The marine electronics device 600 includes a screen 605. In certain implementations, the screen 605 may be sensitive to touching by a finger. In other implementations, the screen 605 may be sensitive to the body heat from the finger, a stylus, or responsive to a mouse. The display device 600 may display marine electronic data 615. The marine electronic data types 615 may include chart data, radar data, sonar data, steering data, dashboard data, navigation data, fishing statistics, and the like. The marine electronics device 600 may also include a plurality of buttons 620, which may be either physical buttons or virtual buttons, or a combination thereof.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computer, and the like.

Various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, the global positioning system (GPS) and like technologies.

Various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Various technologies described herein may be implemented in computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

Figure 7:
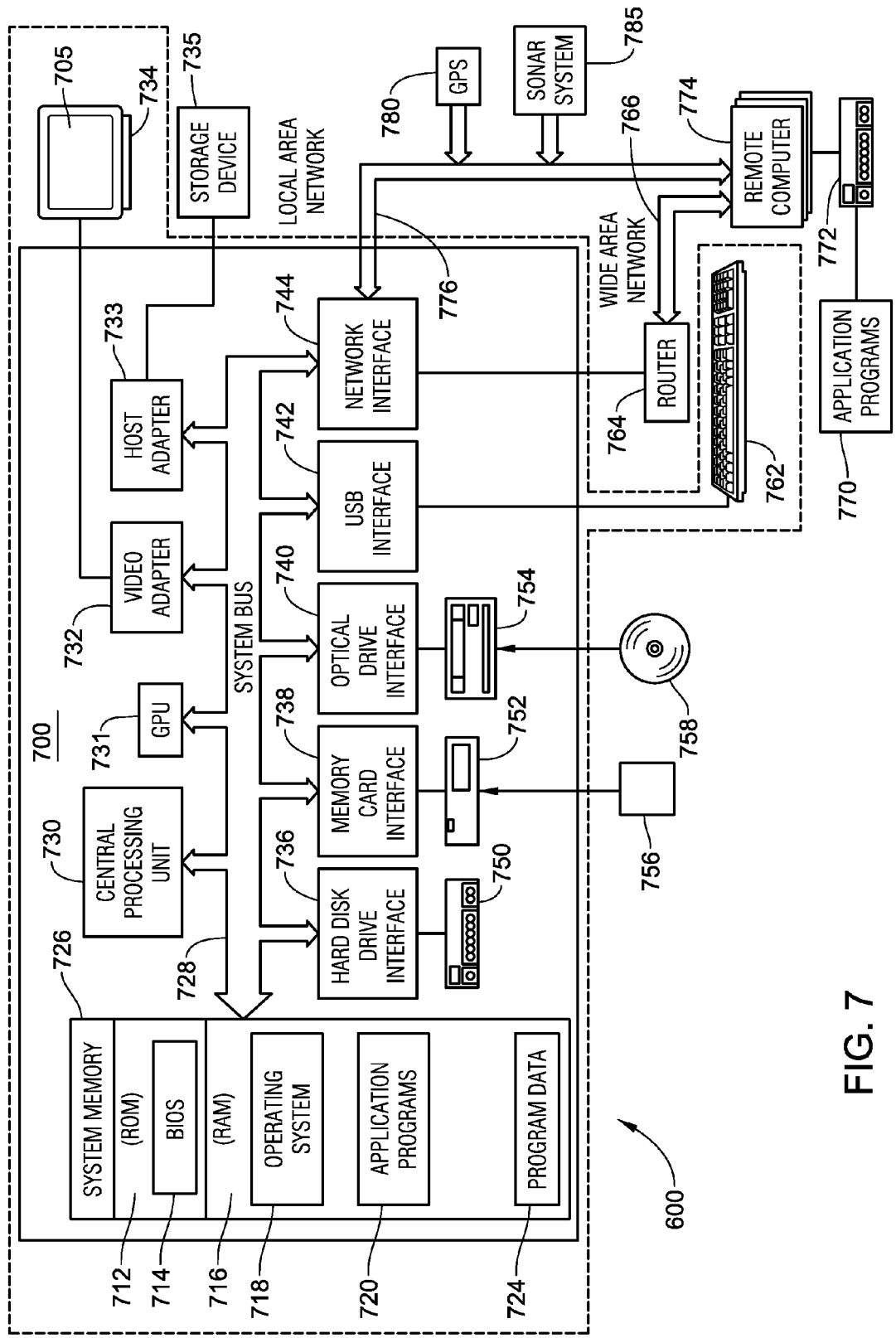
FIG. 7 illustrates a schematic diagram of a computing system in which the various technologies described herein may be incorporated and practiced.

FIG. 7 illustrates a schematic diagram of the waypoint generation system 100 having a computing system 700 in accordance with implementations of various techniques described herein. The computing system 700 may be the camera device 110, the marine electronics device 600, conventional desktop, a handheld device, a controller, a personal digital assistant, a server computer, an electronics device/instrument, a laptop, a tablet, or part of a navigation system, or sonar system. It should be noted, however, that other computer system configurations may be used.

The computing system 700 may include a central processing unit (CPU) 730, a system memory 726, a graphics processing unit (GPU) 731 and a system bus 728 that couples various system components including the system memory 726 to the CPU 730. Although only one CPU 730 is illustrated in FIG. 7, it should be understood that in some implementations the computing system 700 may include more than one CPU 730.

The CPU 730 can include a microprocessor, a microcontroller, a processor, a programmable integrated circuit, or a combination thereof. The CPU 730 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 730 may also include a proprietary processor. The CPU 730 may include a multi-core processor.

The GPU 731 may be a microprocessor specifically designed to manipulate and implement computer graphics. The CPU 730 may offload work to the GPU 731. The GPU 731 may have its own graphics memory, and/or may have access to a portion of the system memory 726. As with the CPU 730, the GPU 731 may include one or more processing units, and each processing unit may include one or more cores.

The CPU 730 may provide output data to a GPU 731. The GPU 731 may generate graphical user interfaces that present the output data. The GPU 731 may also provide objects, such as menus, in the graphical user interface. A user may provide inputs by interacting with the objects. The GPU 731 may receive the inputs from interaction with the objects and provide the inputs to the CPU 730. A video adapter 732 may be provided to convert graphical data into signals for a monitor 734. The monitor 734 includes a screen 705. The screen 705 can be sensitive to heat or touching (now collectively referred to as a "touch screen"). In one implementation, the host computer 799 may not include a monitor 734. In one implementation, the CPU 730 may perform the tasks of the GPU.

The system bus 728 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 726 may include a read only memory (ROM) 712 and a random access memory (RAM) 716. A basic input/output system (BIOS) 714, containing the basic routines that help transfer information between elements within the computing system 700, such as during start-up, may be stored in the ROM 712.

Certain implementations may be configured to be connected to a global positioning system (GPS) 780, and/or a sonar system 785. The GPS 780, and/or sonar system 785 may be connected via the network interface 744. The computing system 700, the monitor 734, the screen 705, and buttons may be integrated into a console.

The computing system 700 may further include a hard disk drive interface 736 for reading from and writing to a hard disk 750, a memory card reader 752 for reading from and writing to a removable memory card 756, and an optical disk drive 754 for reading from and writing to a removable optical disk 758, such as a CD ROM or other optical media. The hard disk 750, the memory card reader 752, and the optical disk drive 754 may be connected to the system bus 728 by a hard disk drive interface 736, a memory card reader interface 738, and an optical drive interface 740, respectively. The drives and their associated computer-readable media may provide nonvolatile storage of computer-readable instructions, data structures, program modules and other data for the computing system 700.

Although the computing system 700 is described herein as having a hard disk, a removable memory card 756 and a removable optical disk 758, it should be appreciated by those skilled in the art that the computing system 700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 700. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 700 may also include a host adapter 733 that connects to a storage device 735 via a small computer system interface (SCSI) bus, a Fiber Channel bus, an eSATA bus, or using any other applicable computer bus interface. The computing system 700 can also be connected to a router 764 to establish a wide area network (WAN) 766 with one or more remote computers 774. The router 764 may be connected to the system bus 728 via a network interface 744. The remote computers 774 can also include hard disks 772 that store application programs 770.

In another implementation, as discussed in more detail with respect to FIG. 2, the computing system 700 may also connect to one or more remote computers 774 via local area network (LAN) 776 or the WAN 766. When using a LAN networking environment, the computing system 700 may be connected to the LAN 776 through the network interface or adapter 744. The LAN 776 may be implemented via a wired connection or a wireless connection. The LAN 776 may be implemented using Wi-Fi technology, cellular technology, or any other implementation known to those skilled in the art. The network interface 744 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 774. It will be appreciated that the network connections shown are exemplary and other means of establishing a communications link between the computer systems may be used. The network interface 744 may also include digital cellular networks, Bluetooth, or any other wireless network interface.

A number of program modules may be stored on the hard disk 750, memory card 756, optical disk 758, ROM 712 or RAM 716, including an operating system 718, one or more application programs 720, and program data 724. In certain implementations, the hard disk 750 may store a database system. The database system could include, for example, recorded points. The application programs 720 may include various mobile applications ("apps") and other applications configured to perform various methods and techniques described herein. The operating system 718 may be any suitable operating system that may control the operation of a networked personal or server computer.

A user may enter commands and information into the computing system 700 through input devices such as a keyboard 762 and pointing device. Other input devices may include a microphone, joystick, game pad, satellite dish, scanner, user input button, or the like. These and other input devices may be connected to the CPU 730 through a Universal Serial Bus (USB) interface 742 coupled to system bus 723, but may be connected by other interfaces, such as a parallel port, Bluetooth, or a game port. A monitor 705 or other type of display device may also be connected to system bus 728 via an interface, such as a video adapter 732 or a wireless interface. In addition to the monitor 734, the computing system 700 may further include other peripheral output devices such as speakers and printers.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating one or more waypoints, the method comprising:
    receiving, at a marine electronics device, an image or video from an external camera device, wherein the image or video was recorded by the camera device at a current location on a body of water;
    determining, at the marine electronics device, positional data defining the current location, wherein the positional data is determined separately from the image or video;
    generating, at the marine electronics device, a waypoint at the positional data defining the current location; and
    storing the image or video in memory of the marine electronics device such that the image or video is associated with the waypoint.

2. The method of claim 1, wherein the camera device is a digital camera, smartphone or a video camera.

3. The method of claim 1 further comprising receiving, at the marine electronics device, in conjunction with receiving the image or video, instructions to generate the waypoint at the current location and to associate the image or video with the generated waypoint.

4. The method of claim 1, further comprising:
receiving, at the camera device, user input indicating a desire to record the image or video at the current location;
recording, in response to receiving the user input, the image or video;
receiving a request to generate the waypoint at the current location and associate the image or video with the generated waypoint; and
sending the recorded image or video to the marine electronics device along with instructions to generate the waypoint at the current location and to associate the image or video with the generated waypoint.

5. The method of claim 1 further comprising sending the generated waypoint and the associated image or video to a cloud server for storage.

6. The method of claim 1, wherein the navigational data comprises latitude or longitudinal coordinates of the marine electronics device.

7. The method of claim 1, wherein the waypoint comprises information pertaining to depth data at the current location, wherein the depth data was generated using a sonar system in communication with the marine electronics device.

8. The method of claim 1 further comprising displaying, on a screen of the marine electronics device, the generated waypoint as an icon on a map, wherein the icon comprises a thumbnail of the image or video associated with the generated waypoint.

9. A non-transitory computer-readable medium having stored thereon a plurality of computer-executable instructions which, when executed by a computer, cause the computer to:
receive, at a camera device, user input indicating a desire to record an image or video at a current location on a body of water;
record, in response to receiving the user input, the image or video;
receive a request to generate a waypoint at the current location and associate the image or video with the generated waypoint; and
send the recorded image or video to a marine electronics device along with instructions to:
 determine, at the marine electronics device, positional data defining the current location, wherein the positional data is determined separately from the image or video;
 generate the waypoint at the positional data defining the current location; and
 store the image or video in memory of the marine electronic device such that the image or video is associated with the generated waypoint.

10. The non-transitory computer-readable medium of claim 9, further comprising computer-executable instructions which, when executed by the computer, cause the computer to associate the recorded images or videos with the instructions using metadata stored with the recorded images or videos.

11. The non-transitory computer-readable medium of claim 9, wherein the camera device is a digital camera, smartphone, or a video camera.

12. A non-transitory computer-readable medium having stored thereon a plurality of computer-executable instructions which, when executed by a computer, cause the computer to:
receive, at a marine electronics device, an image or video from an external camera device, wherein the image or video was recorded by the camera device at a current location on a body of water;
determine, at the marine electronics device, positional data defining the current location, wherein the positional data is determined separately from the image or video;
generate, at the marine electronics device, the waypoint at the positional data defining the current location; and
store the image or video in memory of the marine electronics device such that the image or video is associated with the waypoint.

13. The non-transitory computer-readable medium of claim 12, further comprising computer-executable instructions which, when executed by the computer, cause the computer to:
receive an image identifier for the image or video at substantially the same time that the instructions for generating the waypoint was received; and
associate the generated waypoint with the image or video using the image identifier.

14. The non-transitory computer-readable medium of claim 13, wherein the image identifier is a reduced-size image of the image.

15. The non-transitory computer-readable medium of claim 12, wherein the computer-executable instructions which, when executed by the computer, cause the computer to receive, at the marine electronics device, in conjunction with receiving the image or video, instructions to generate the waypoint at the current location and to associate the image or video with the generated waypoint.

16. The non-transitory computer-readable medium of claim 12, further comprising computer-executable instructions which, when executed by the computer, cause the computer to display, on a screen of the marine electronics device, the generated waypoint as an icon on a map, wherein the icon comprises a thumbnail of the image or video associated with the generated waypoint.

17. A non-transitory computer-readable medium having stored thereon a plurality of computer-executable instructions which, when executed by a computer, cause the computer to:
display a plurality of stored images, wherein each of the plurality of stored images is associated with a waypoint;
receive a first selection of a first image from among the plurality of stored images;
receive a second selection of a second image from among the plurality of stored images, wherein the first image is different than the second image;
determine a first waypoint associated with the first image;
determine a second waypoint associated with the second image;
generate a navigation route having the first waypoint and the second waypoint; and
display the navigation route.

* * * * *